Jan. 29, 1963   B. B. MATHIAS   3,075,382
APPARATUS FOR ACOUSTICALLY MEASURING VOLUME
Filed Sept. 9, 1958
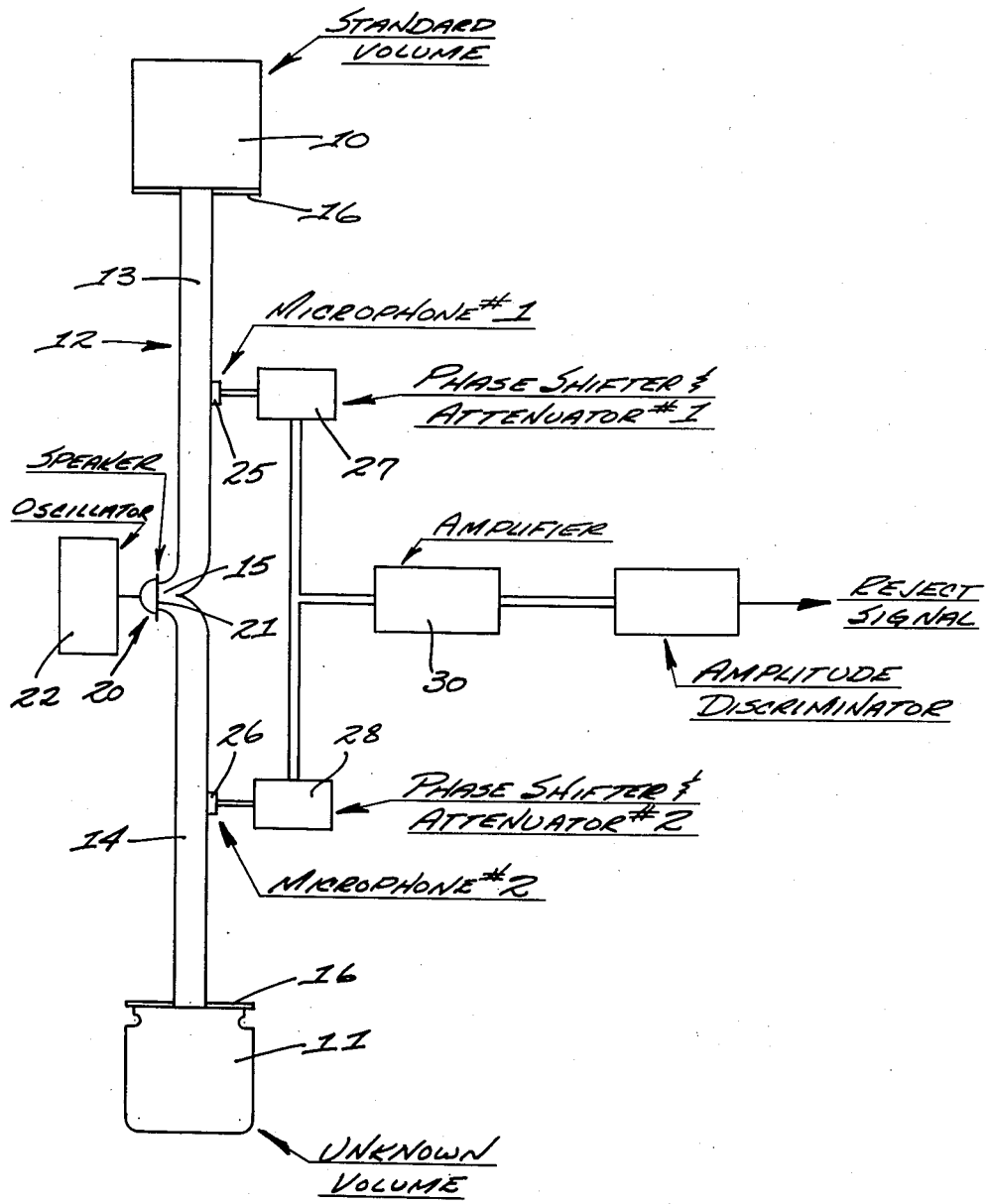
INVENTOR.
BENNY B. MATHIAS
BY W. A. Scharch &
Leonard D. Soubier
ATTORNEYS

United States Patent Office 3,075,382
Patented Jan. 29, 1963

3,075,382
APPARATUS FOR ACOUSTICALLY MEASURING
VOLUME
Benny B. Mathias, Toledo, Ohio, assignor to Owens-Illinois Glass Company, a corporation of Ohio
Filed Sept. 9, 1958, Ser. No. 759,925
1 Claim. (Cl. 73—149)

The present invention relates apparatus for acoustically measuring volume. More particularly, this invention proposes a novel apparatus for determining the correspondence or lack of correspondence between a known volume and an unknown volume generally independently of the shape of either volume.

This application discloses the specific improvement over the method and apparatus of Firestone Patent 2,285,151, assigned to the assignee of the present invention. In the Firestone patent, a single microphone or similar pressure-sensitive device is subjected to mutually canceling pressure oscillations from a known volume and an unknown volume if the two volumes were identical. If the two volumes were different, a differential pressure would be exerted upon and detected by the microphone. The Firestone system connected the volumes, respectively, to opposite sides of a pressure-creating diaphragm in order to increase the pressure in one volume while simultaneously reducing the pressure in the other volume, thereby obtaining gas oscillations theoretically equal in magnitude and opposite in phase at the microphone when the volumes were the same.

The invention herein disclosed utilizes a pair of vibration-sensitive means for determining the physical characteristics of acoustic vibrations set up in each volume by a common vibrating means, the vibrations being in phase since both volumes simultaneously receive pressure impulses from a common vibration-creating source.

The frequency of vibration is the resonant frequency for the known volume and its connecting conduit, so as to obtain maximum amplitude at the location of the microphone or other vibration-sensitive means for the known volume. If the unknown volume is identical with the known volume, then it will have the same resonant frequency and its similarly located microphone will receive vibrations of the same amplitude and frequency and in exact phase with those of the known volume. By converting the vibrations received at the microphones into electrical energy and comparing the voltage output of the microphones, a determination of the correspondence or lack of correspondence between the standard volume and the unknown volume can be readily made. By utilizing low frequency vibrations to produce sound waves of relatively long wave lengths compared with the dimensions of the apparatus, the volume comparison is, for all practical purposes, independent of the geometry of either volume.

It is, therefore, an important object of the present invention to provide a new and improved acoustic apparatus for the comparison of a known volume and an unknown volume, the comparison being made independently of the shape of either volume.

Another object of the present invention is the provision of means for acoustically determining the correspondence or lack of correspondence between a pair of volumes relatively independently of the contour of either volume, by setting up in the volumes gas vibrations of identical frequency, amplitude and phase, and then comparing the character of the resultant gas oscillations in the volumes.

It is a further important object of the present invention to produce in a known volume resonant acoustic vibrations and setting up the corresponding vibrations in an unknown volume and comparing the resonance characteristics of the vibrations.

Yet another important object of the present invention is the provision of an apparatus for determining the correspondence between a known volume and an unknown volume including elongated gas-filled conduits communicating with the two volumes, means for inducing acoustic vibrations in the conduits and the volumes, the vibrations being initially identical in frequency, amplitude and phase, a microphone located in each of the conduits, and means for comparing the electrical energy outputs of the microphones.

Other and further objects of the invention will appear from the following detailed description taken in conjunction with the annexed drawings, in which:

On the drawings—

The single figure schematically represents an apparatus of the present invention.

As shown on the drawings—

Reference numeral 10 refers to a standard volume defined by and enclosed within an air-tight enclosure, and reference numeral 11 refers to an unknown volume, the volume of which is to be determined. In practice, the volume 11 to be measured may be a container, such as a bottle, jug or jar formed of glass, plastic, or other similar solid material.

The volumes 10 and 11 are interconnected by means of a branched, tubular conduit 12 having substantially identical legs 13 and 14 of the same cross-section and length joined through a common throat section 15 fully communicating with a vibration producing means, such as a speaker 20. The volumes 10 and 11 are sealed to the conduit 12, as by resilient pads 16.

The speaker 20 is provided with a resiliently deflectable diaphragm 21 stretched across throat section 15 and actuated by an oscillator or similar means 22 for oscillation at a constant, predetermined frequency.

Preferably, the speaker diaphragm 21 is oscillated at the resonant frequency of the standard volume 10 and its connecting conduit 13. By so vibrating the speaker, the resonant vibrations set up in the standard volume and its connecting tube 13 will have a predetermined, constant amplitude and frequency at any point within either the tube 13 or the volume 10.

A microphone 25 is located along the length of the tube 13, the microphone diaphragm being oscillated by the vibrations within the tube 13 at the frequency of the resonant frequency of the tube and volume and at an amplitude determined by the location of the microphone 25.

A similar microphone 26 is located at an equivalent position to the microphone 25 but intermediate the speaker diaphragm 21 and the unknown volume 11. The microphone 26 will be vibrated in accordance with the vibrations from the speaker 21 set up within the tube 14 and the unknown volume 11.

If the known volume 10 and the unknown volume 11 are the same, then the resonant frequency of the unknown volume 11 and the tube 14 will be the same as the resonant frequency of the standard volume 10 and the tube 13. In other words, if the two volumes are the same they will vibrate at the same resonant frequency, and the microphones 25 and 26 will operate in phase and at equal amplitude.

In order to calibrate the microphones 25 and 26 so that they do have outputs of the same amplitude and in exact phase, each microphone is provided with a phase shifter and an attenuator circuit of well-known conventional design, such circuits being indicated by diagram box 27 and 28 for the microphones 25 and 26, respectively. In order to calibrate the microphones, the unknown volume 11 is replaced with a volume equal to the standard 10, so that both sides of the apparatus are identical. The speaker diaphragm 21 is then actuated at resonant frequency, and the microphones are tuned through their phase shifter and attenuator circuits until any differences in response of the two microphones have been adjusted. The outputs of the two microphones 25 and 26 are fed through their respective phase shifter and attenuator circuits in opposition to an amplifier circuit, also of known design. When the volumes 10 and 11 are the same, the opposition of the tube outputs of equal phase, amplitude and frequency will result in a zero voltage input to the amplifier 30 and consequently there is no amplifier input to be amplified.

When the volume 11 differs from the standard volume 10, the output of the microphones 25 and 26 are out of phase and of different amplitudes, thereby resulting in an input voltage to the amplifier. The amount of the input voltage into the amplifier circuit 30 depends upon the difference between the standard volume and the volume 11. The amplified resultant signal from the amplifier circuit 30 is fed into an amplitude discriminator and therefrom into a reject signal means, such as a relay which can be actuated only by an amplitude voltage of predetermined magnitude.

Thus, it will be seen that the present invention provides a new and novel apparatus and method for determining the relative capacities or volumes of a standard and an unknown volume.

One of the unique features of this invention is that by the utilization of low frequency vibrations of a wave length relatively large compared with the dimensions of the apparatus, the volume measurement is substantially independent of the geometry of the volume. In other words, a standard cubic volume made to very precise geometric dimensions may be compared with a relatively irregular volume of a container or the like. The utilization of low frequency vibrations makes possible the dissemination of the vibration completely throughout the standard volume, thereby insuring an accurate reflection of the complete volume under test.

Further, the device is of particular utility in connection with the testing glass containers, inasmuch as its accuracy is of such order that it may be utilized to determine or detect the presence of bulged and sunken sides of glass containers which would necessarily affect the volume of the container, although the volume change is of relatively low order. Additionally any momentary change in volume because of leakage through the seal of the unknown volume to the conduit 14 can be determined, inasmuch as there will be a loss of acoustical energy through any such leak and vibrations of the same amplitude and phase will not be obtained, even though the volume of the container under test may be the same as the standard volume.

In the device of this invention, the microphones or other pressure-sensitive means need not be located at an acoustic node. This means that the device need not be of a size corresponding to the wave length of the vibrations set up by the vibration-creating means. The microphones are located at the same distances from the speaker and are oriented so as to pick up vibrations of the same amplitude and frequency when the volumes are the same.

Thus, the present device provides the first commercially useable volume measuring unit utilizing a comparison of the acoustic properties of known and unknown volumes.

I claim:

An apparatus for comparing the unknown volume of a container with the known volume of a standard container, comprising a pair of tubular air chambers, each communicating with one of said containers, respectively, means forming a throat section common to each of said tubular air chambers, a vibration creating means at said throat section for commonly acoustically exciting each of said air columns in phase, a microphone positioned on the tubular air chamber communicating with said standard container spaced from said throat section, a second microphone on the other of said tubular air chambers spaced from said throat section a distance equal to the distance said first microphone is spaced from said throat section, said second microphone being located on said other tubular air chamber, means for combining the electrical signals produced by said microphones in opposition, and means for detecting any difference in the electrical signals produced by said microphones.

References Cited in the file of this patent
UNITED STATES PATENTS

| | | |
|---|---|---|
| 2,285,151 | Firestone | June 2, 1942 |
| 2,666,326 | Poole et al. | Jan. 19, 1954 |